Nov. 15, 1960  R. A. COTTER ET AL  2,960,297
AUTOMATIC POWER RELEASE APPARATUS
Filed April 14, 1958  5 Sheets-Sheet 1

INVENTORS
RICHARD A. COTTER
PETER MINICUCCI, JR.
BY
Dike, Thompson & Bronstein
ATTORNEYS Nov. 15, 1960 R. A. COTTER ET AL 2,960,297
AUTOMATIC POWER RELEASE APPARATUS
Filed April 14, 1958 5 Sheets-Sheet 2

INVENTORS
RICHARD A. COTTER
PETER MINICUCCI, JR.
BY
*Dike, Thompson & Bronstein*
ATTORNEYS Nov. 15, 1960  R. A. COTTER ET AL  2,960,297
AUTOMATIC POWER RELEASE APPARATUS
Filed April 14, 1958  5 Sheets-Sheet 3

INVENTORS
RICHARD A. COTTER
PETER MINICUCCI, JR.
BY
Dike, Thompson & Bronstein
ATTORNEYS Nov. 15, 1960 R. A. COTTER ET AL 2,960,297
AUTOMATIC POWER RELEASE APPARATUS
Filed April 14, 1958 5 Sheets-Sheet 4

INVENTORS
RICHARD A. COTTER
PETER MINICUCCI, JR.
BY
*Dike, Thompson & Bronstein*
ATTORNEYS

United States Patent Office 2,960,297
Patented Nov. 15, 1960

2,960,297

AUTOMATIC POWER RELEASE APPARATUS

Richard A. Cotter, East Greenwich, and Peter Minicucci, Jr., Providence, R.I., assignors to Speidel Corporation, Providence, R.I., a corporation of Rhode Island Filed Apr. 14, 1958, Ser. No. 728,418

11 Claims. (Cl. 244—150)

The present invention relates to automatic power release apparatus and, in one particular aspect, to improved emergency power release mechanisms operating to safeguard personnel in ejection from aircraft.

Occurrence of certain emergency conditions aboard craft in flight may require swift ejection of parachute-equipped personnel, even though the then-existing craft speed and altitude may be far from optimum for comfortable descent. In one bail-out process, for example, the protective transparent canopy of a craft is first loosened and the pilot and seat are next thrust explosively from the airframe, the opening of parachute equipment and separation of pilot and seat thereafter being subject to automatic control. Virtually all of the involved steps in the escape process must be capable of such automatic occurrence, to insure that incapacitated personnel will descend safely and that protection will be achieved under speed or other environmental conditions rendering human responses and control inadequate. In other application, such as the landing of cargo rather than personnel, the actuating and release mechanisms are necessarily fully automatic in their operation. One highly important control operation involves an automatic time delay prior to release of a parachute, whereby it is assured that personnel or cargo and chute can escape collision with the damaged craft from which they have been ejected, and a second important function involves control of parachute release at safe altitudes where the atmosphere is of density promoting efficient chute opening without fouling and entanglement. It will be readily understood that equipments for executing these vital functions should possess precision operating characteristics and should be highly immune to failure under the extraordinarily severe environmental conditions experienced during flight and ejection. Further, sensitive control mechanisms, such as those responding to atmospheric pressure, must nevertheless be made capable of releasing vast stored forces for the needed actuation, and associated timing devices should perform with special accuracy and reliability. Craft pay load and maintenance considerations dictate that such apparatus be of minimum size and weight and of simple rugged construction, preferably with self-monitoring provisions also.

Accordingly, it is one of the objects of the present invention to provide improved actuating apparatus wherein sturdy uncomplicated measuring mechanisms having relatively low-level operating forces accurately control release of large stored actuating forces.

It is a further object to provide improved apparatus for automatic control of personnel or cargo ejection and landing from aircraft, involving compact and precise timing and altitude sensing components which are substantially insensitive to effects of acceleration and shock.

Yet another object is to provide novel and improved control timing apparatus of simple low-cost construction which functions accurately under severe acceleration conditions.

By way of a summary account of practice of this invention in one of its aspects, there is provided a compressible power spring which is rapidly expandable to forcibly actuate a parachute release member, control of the power spring expansion being under influences of an arming pin, a pressure sensor, and a timing mechanism. The timing mechanism includes a pre-stressed main spring assembly which, when unlocked by the arming pin and pressure sensor, exerts a constant torque upon a balanced governor possessing relatively large inertia. At the end of a predetermined interval dependent upon the initial setting of the timer, the inertia-restrained timing mechanism orients a low-torque cam shaft to an angular position in which a follower, which restrains the power spring, may deflect to permit sudden expansion of the power spring which actuates the associated parachute release member. Both the timing mechanism and pressure sensor are isolated from power spring forces, and both are physically balanced to possess further isolation from effects of gravity or other accelerations.

Although the features of this invention which are believed to be novel are set forth in the appended claims, the details of preferred embodiments and further objects and advantages may be most readily comprehended through reference to the following description taken in connection with the accompanying drawings, wherein:

Figure 1:
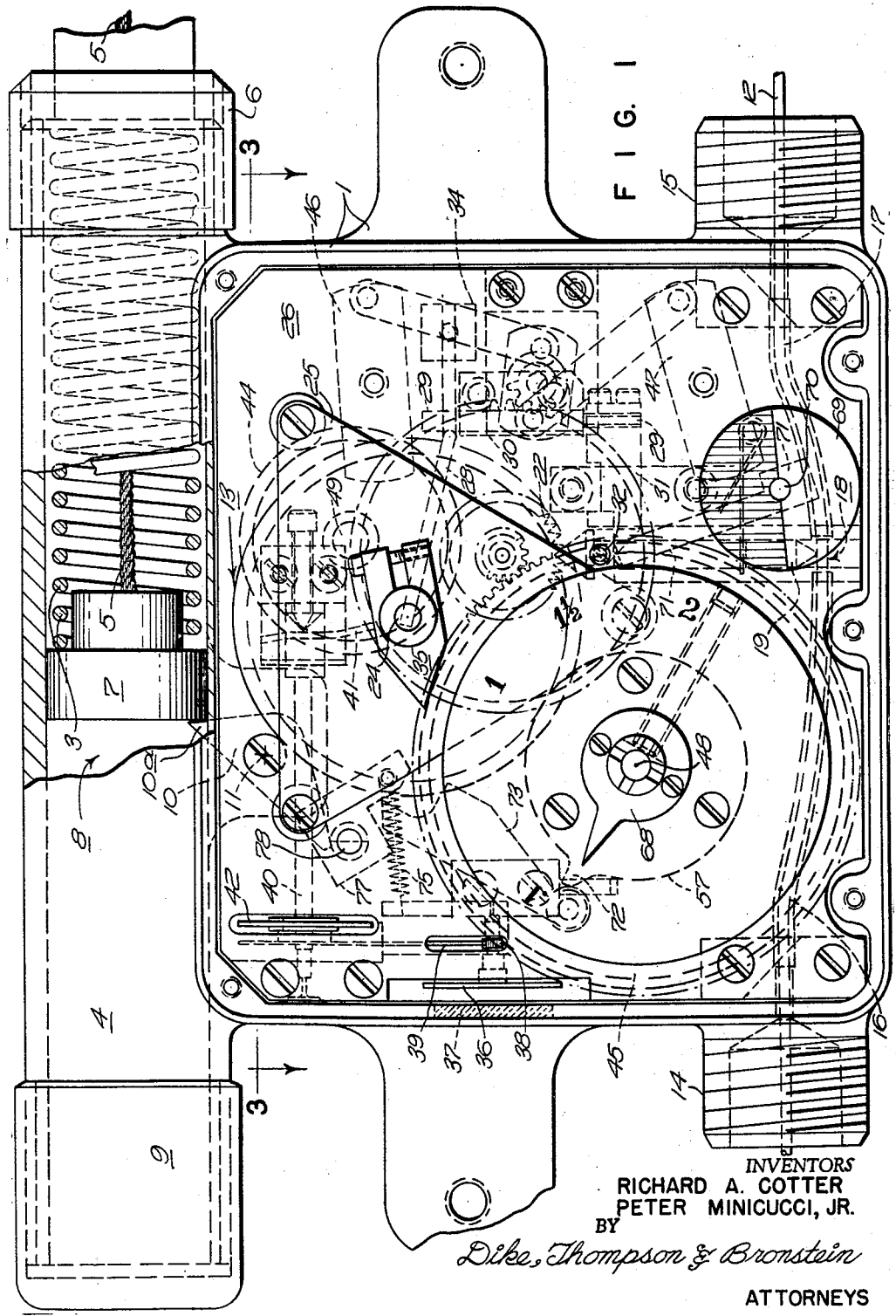
Figure 1 illustrates a plan view of automatic power release apparatus practicing teachings of the present invention, the outer cover for the apparatus being removed to reveal internal constructional features.
Figure 2:
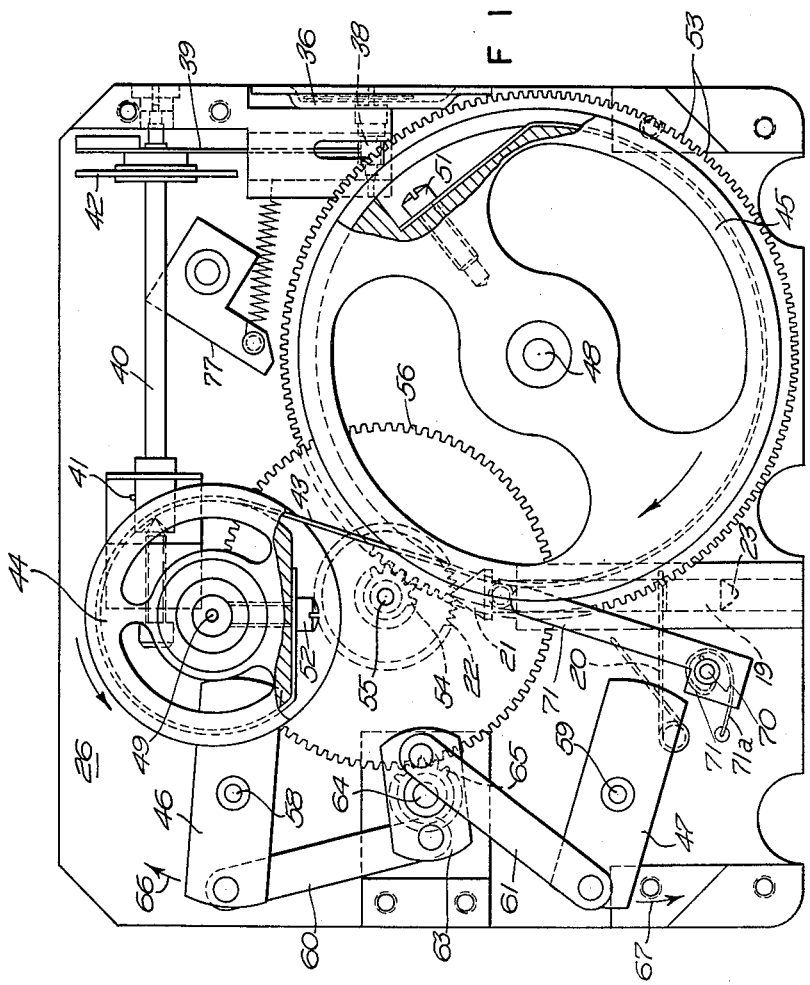
Figure 2 is a view of a portion of the equipment shown in Figure 1 taken from the underside thereof.
Figure 5:
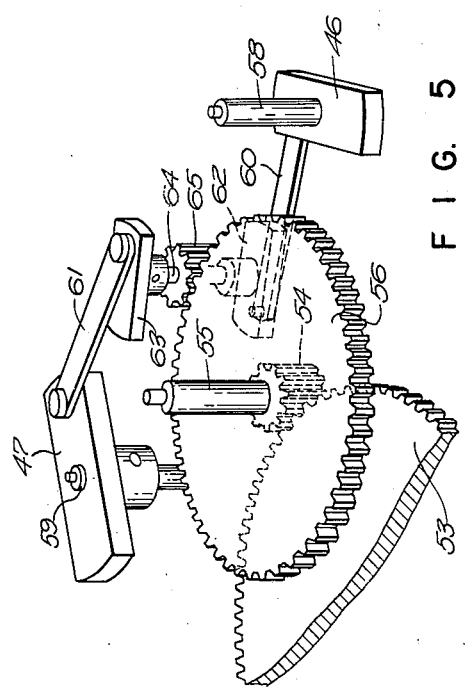
Figure 3:
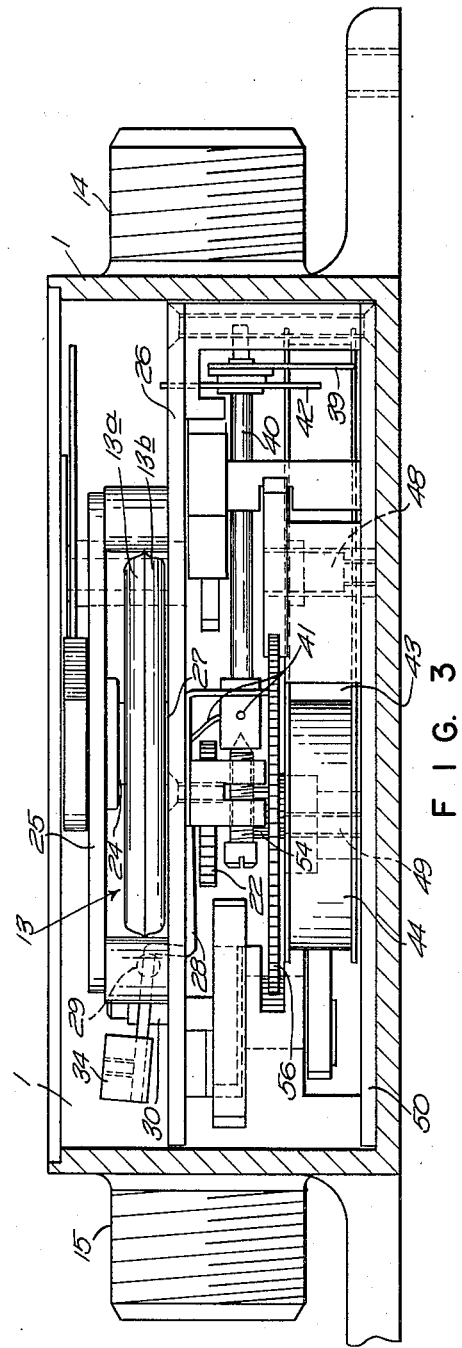
Figure 4:
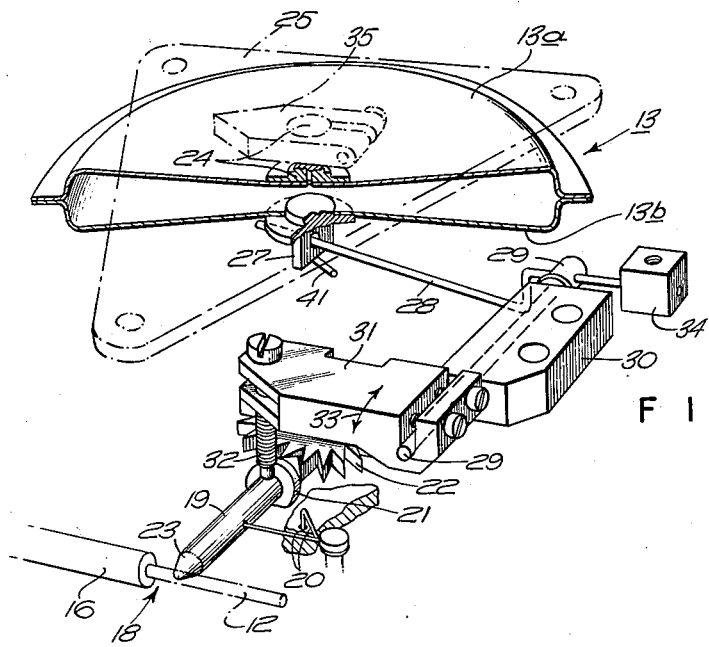
Figure 6:
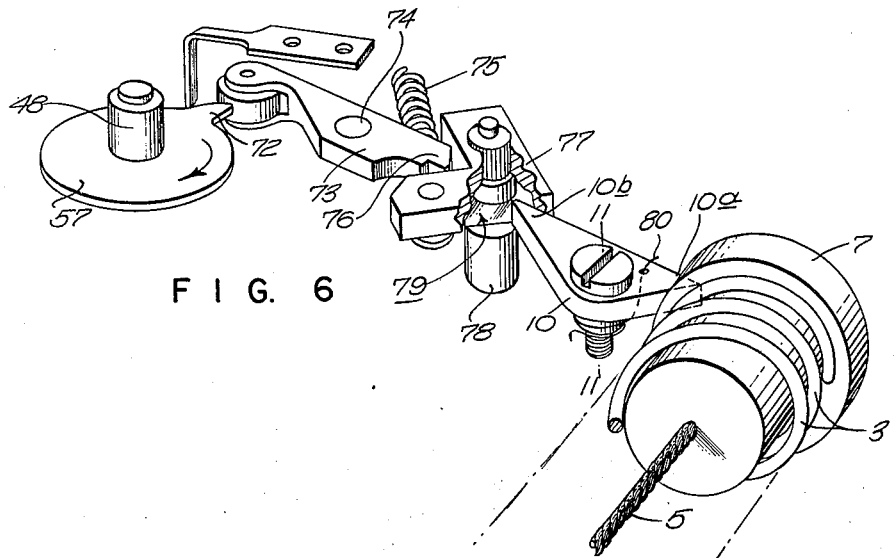
Figure 4A:
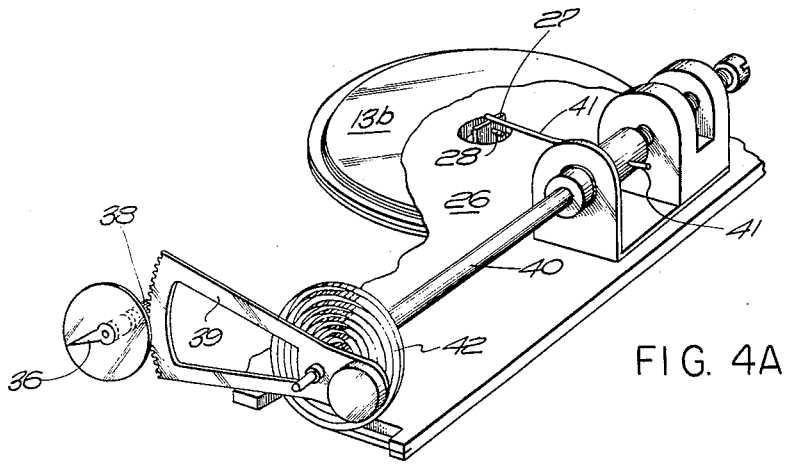
Figure 5A:
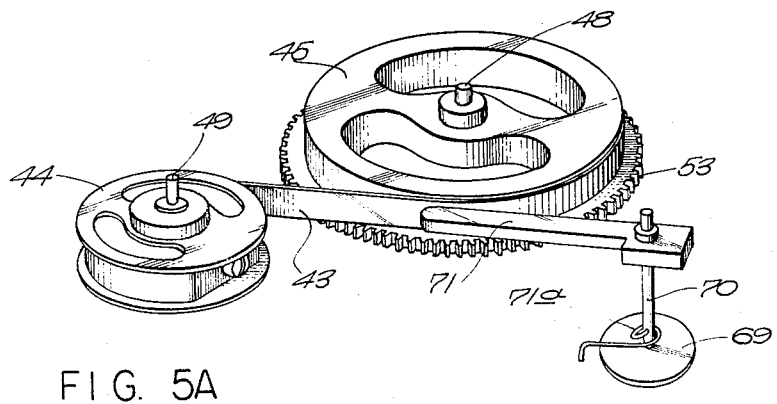

Figure 3 presents a cross-sectioned side view of the same apparatus taken along the section line 3—3 in Figure 1;

Figure 4 pictorially represents aneroid control mechanisms;

Figure 4A is a pictorial illustration of elements for signalling aneroid leakage;

Figure 5 depicts pictorially certain elements of a balanced escapement employed in a timing unit;

Figure 5A is a pictorial illustration of elements for indicating drive spring malfunctions; and Figure 6 illustrates portions of a sensitive power spring release assembly which is part of the apparatus shown in Figures 1 through 3.

The apparatus for practicing this invention which is portrayed in Figures 1 through 3 includes a main frame or casing 1 in which are housed actuating and control mechanisms for the automatic release of mechanical forces stored in a power spring 3. In one application, for example, power spring 3 is to be pre-stressed by compression within the elongated tubular casing portion 4 for the controlled actuation of a parachute rip chord upon sudden expansion of this spring. Desired output forces are those which are exerted upon an output member 5, in the form of a cable, as power spring 3 expands both against the tubular casing end piece 6 and against the cylindrical cap 7 which is axially slidable within the accommodating cylindrical bore 8 of tubular casing portion 4. Slidable spring cap 7 is firmly secured with output cable 5, and the compression of spring 3 to the illustrated state will be understood to have been achieved in a preceding arming operation, which operation may be performed by inserting a suitable tool (not shown) through the removed end piece 9 and manually thrusting cap 7 toward the opposite end piece 6. Release of the stored spring forces is under immediate influence of an arming lever 10 which is pivoted within casing 1 and which may have an end 10a thereof projecting into the bore 8 to present an obstruction to movement of spring cap 7 from the depicted fully-armed position. Pivotal movements of the lever arm 10 about its pivot axis 11, for removal of the aforesaid obstruction and for desired sudden release of the stored spring forces, are in turn under influence of (a) position of an arming pin 12, (b) condition of a pressure-responsive unit including an aneroid diaphragm structure 13, and (c) time lapse established by a release timing unit.

A primary control function is exercised by the arming pin or wire 12, in that the actuations and control by the two additional units cannot take place until this wire has first been withdrawn from the casing. In aircraft escape practice, this flexible wire is fastened at one end to the airframe or to a seat and, upon separation of the parachute-equipped pilot from the craft or seat, the wire automatically becomes withdrawn from the release apparatus travelling with the pilot. Subsequently, the timing and altitude-sensing units may exercise their release control functions to insure that the parachute is opened properly. For this primary control purpose, the flexible wire 12 is admitted to the release mechanism casing 1 through couplings 14 or 15 and is guided through the interior of the casing by two aligned sections of rigid tubing 16 or 17 which are separated from one another by a small gap 18. When inserted into either of these tubing sections, the arming wire 12 then becomes exposed for a control operation across the length of gap 18 where it is disposed to interfere with axial movement of a locking pin 19, best perceived in Figure 4. Locking pin 19 is axially slidable in a bore within a bracket in the mechanism casing and is axially biased by a spring 20 such that it normally seeks to remove its enlarged and pointed locking end 21 from engagement with a critical locking gear 22. As will be detailed further later herein, locking gear 22 must be freed for movement before release of the main power spring forces is enabled. However, insertion of wire 12 into the mechanism results in axial deflection of locking pin 19 to the illustrated locking relationship with gear 22, and it may be apparent that unlocking thus cannot occur until this wire is removed and the locking pin freed for axial movement in the gap 18. Conically-shaped end 23 of pin 19 serves a desired camming function as the arming wire is passed through gap 18 when the mechanism is first being set.

The locking and unlocking of gear 22, and therethrough, the release of power spring forces, is further regulated by a pressure responsive unit shown in the form of an altitude sensing aneroid 13. Referring to Figures 1, 2 and 4, this device is represented as a capsule 13 including sealed flexible diaphragms 13a and 13b, which are at least partially evacuated and which possess the known characteristic of expanding and contracting as the ambient atmospheric pressure varies. One of these diaphragms, 13a, is centrally secured to a stud 24 which is adjustably mounted upon a triangular bracket 25 spaced from and affixed to a mounting plate 26 within the casing 1. The other of these diaphragms, 13b, is centrally attached to a post 27 and linearly moves this post as the diaphragms deflect outwardly away from one another and inwardly toward one another upon decrease and increase, respectively, of the sensed ambient atmospheric pressure. An aneroid link arm 28, which is fixed with a shaft 29 rotatably journalled in a bearing block 30, is coupled with movable post 27 by way of an accommodating aperture therein, whereby shaft 29 and its attached lever arm 31 and adjustable catch pin 32 are rotated in one or another direction about the axis of shaft 29 as the sensed altitude changes in one or another sense. Arrows 33 indicate these directions of angular movement. Adjustable counterweight 34 on an extension of link arm 28 provides a balance of the several movable masses effective about the longitudinal axis of shaft 29 and thereby renders the actuating linkage rotationally insensitive to adverse influences of acceleration and shock. Catch pin 32 is normally disposed in interfering relationship with the enlarged head 21 of locking pin 19 while the experienced barometric pressures are below a predetermined value related to a predetermined altitude level. In this condition, which is represented in Figure 4, the locking pin is preserved in locking engagement with gear 22 and prohibits release of the forces stored in compressed power spring 3. However, as altitude is decreased, diaphragms 13a and 13b are compressed together by the increased pressure and raise the post 27. This is effective to elevate the catch pin 32 until, at a predetermined altitude, catch pin 32 frees the locking pin 19 and permits it to be withdrawn from locking engagement with gear 22 by its spring 20 if the arming wire 12 has also been withdrawn from the mechanism. At this point, the release timing unit which is operative when gear 22 is unlocked can proceed to release arming lever 10 upon expiration of a pre-set timing interval. Adjustment of an exact altitude level at which the catch pin release of locking pin 19 will occur can be set at the factory by rotational adjustment of the threaded catch pin 32 in its supporting lever arm 31 or, in the field, by rotational adjustment of the clamping pointer 35. For the latter purpose, pointer 35 cooperates with suitable indicia marked upon the exposed upper surface of triangular bracket 25, and the rotation of pointer 35 may be effected to displace aneroid stud 24 axially through action of appropriate cam surfaces, threading, or the like.

In the event leakage should develop in the evacuated aneroid unit, the lower aneroid diaphragm 13b would expand downwardly away from the fixed upper diaphragm and occasion rotation of the catch pin into a non-releasing relationship with locking pin 19. This condition must obviously be immediately detectable, inasmuch as the release mechanism would then be inoperative for its intended purposes, and a clear warning indication is highly desirable. Provision is made for this indication by way of a distinctively-marked rotatable warning indicator dial 36 which is mounted on a frame bracket and is visible through the casing window 37, as shown in Figures 1 and 4A. Actuation of dial 36 is by way of an affixed pinion 38 which is driven by a sector gear 39 rotatable with a drive shaft 40. Drive shaft 40 is, in turn, moved angularly by an attached follower lever arm 41 which is resiliently urged against the lower aneroid post 27 in the manner of a follower by action of the light spiral spring 42 coupled between shaft 40 and a part of the supporting casing 1. These relationships may be perceived through reference to Figures 1 through 4. Depression of aneroid post 27, upon occurrence of a leak angularly moves lever arm 41 and its attached drive shaft through a large angle such that sector gear 39 rotates the warning dial 36 by an amount sufficient to indicate a malfunctioning condition.

As thus far described, the release mechanism may prepare for stored power release under influence of both arming wire position and altitude conditions. There is further provided at time delay unit which may regulate the power release only after a predetermined interval has elapsed following conditioning of the mechanism by both the arming wire and altitude sensor. Principal elements of this time delay unit are found in ribbon-like flat spring member 43, a pair of rotatable cylindrical drums 44 and 45, and a gear-driven governor including a pair of like pivoted inertia members 46 and 47. Main drum 45 and the spaced cooperating spring take-up drum 44 have their parallel support shafts 48 and 49, respectively, mounted for rotation in the spaced frame plates 26 and 50. Ends of flat spring 43 are fixed to drums 45 and 44 by set screws 51 and 52, respectively, as is shown in the Figure 3 view taken from the under side of the mechanism, and the spring normally tends to stretch somewhat taut between the restrained main drum 45 and the freely rotatable take-up drum 44 onto which the spring seeks to coil or curl itself spirally. The last-noted tendency occurs because the flat spring 43 has been processed and prestressed to have a natural curvature more closely corresponding to that of the take-up drum, and it is characteristic of such an arrangement that in tending to curl itself upon the take-up drum the spring will impart substantially constant torque to the main drum 45, which then tends to be driven angularly about its axis of rotation.

In attempting to turn about its pivot axis responsive to the constant torque impressed by spring 43, the main drum also seeks to rotate the friction coupled main gear 53. The latter gear is meshed with a pinion 54 (Figures 2 and 3) fixed upon a single shaft 55 together with the aforedescribed locking gear 22 and with an intermediate gear 56, whereby the three gears 54, 22 and 56 must turn simultaneously. The permissible rate of gear and drum rotation is a controlled one, and is established by a special governor which insures that cam 57 (Figures 1 and 6) rotatable with main drum 45 will initiate release of power spring 3 only after a predetermined period. This governor includes the two pivoted inertia members 46 and 47 which are supported in frame plates 26 and 50 by shafts 58 and 59, respectively, and which are oscillated about these shafts by pivoted connecting rods 60 and 61, respectively. Connecting rods 60 and 61 are in turn pivotally connected with the crank members 62 and 63 affixed to a crank shaft 64 having an attached drive pinion 65 in engagement with intermediate gear 56. The connections of connecting rods 60 and 61 with crank members 62 and 63 are eccentric in relation to the axis of crank shaft 64 and are at one fixed radial distance from this axis at positions displaced from one another by 180 degrees. Although the driven ends of the connecting rods are disposed on diametrically opposite sides of crank shaft 64, their driving ends are pivotally coupled with the inertia members 46 and 47 on a common side of the three shafts 58, 59 and 64, whereby, as the shaft 64 is rotated by effects of the drive spring 43, the inertia members are angularly moved in opposite directions about their shafts 58 and 59. Referring to Figure 2 in this connection, the inertia member 46 will be driven through a small arc in the direction of arrow 66 while member 47 is driven in the opposite angular direction of arrow 67, and conversely during the next half cycle of oscillatory movements. Both of inertia members 46 and 47 are of like mass and proportions, and their parallel pivot shafts 58 and 59 are disposed at the same distance from the parallel crank shaft 64. The constructional features of this governor are significant in that they overcome possible serious errors due to shock, vibration and acceleration. Such applied forces as will operate upon one of the inertia members and its linkages to accelerate the crank shaft in one angular direction must also act upon the other inertia member and its linkages to accelerate the crank shaft in the opposite angular direction, and the two effects become mutually cancelling. Crank shaft 64 thus has its rate of rotation controlled solely by the total inertias of the driven oscillating structure, without responding to disturbing influences of environmental forces. It is further advantageous that conventional delicate escapement elements such as hair-springs, balance wheels, escapement levers, and the like, are avoided and that the rugged governor is of a non-jamming character. Precision timing is materially aided through use of the described constant-torque spring and drum assembly. Repeatability is precise because the same portions of the drive spring 43 are used in each setting of the timer for a particular value of time delay. For setting purposes the main drum shaft 48 is rotated by manipulation of the attached setting knob 68 (Figure 1) until a predetermined length of flat drive spring 43 is wound on drum 45 from the take-up drum 44, this operation being performed at a relatively low altitude with arming wire 12 inserted and while the locking pin 19 locks the gears 22, 53, 54, and 65. Desired setting time may be established through reference to orientation of the setting pointer 68 in relation to cooperating indicia marked upon the exposed top surface of a dial on plate 26. Drum 45, and 57, and pointer 68 are permitted to turn in relation to the gear train during the setting operation by virtue of a slip-friction coupling between the cam 57 and gear 53. Setting can be accomplished only by inserting arming wire 12 into the mechanism, whereby the locking pin 19 then locks gear 22 and the other gears in its train. The latter requirement introduces a safety feature, in that the mechanism cannot be inadvertently wound and set to a desired time delay condition without first correctly positioning the arming wire within the mechanism. It will be perceived that the rotation of setting pointer 68 achieves the winding of drive spring 43 and that this need not be accomplished in a separate operation. Further, it becomes impossible to set the timer without simultaneously and automatically winding the drive spring, whereby an additional safety feature and simplification are realized.

Drive springs such as the timer spring 43 are under maximum stress at positions intermediate the two associated drums, and, while spring breakage is uncommon, it is more likely to be encountered there than at other positions. Because the mechanism may become inoperative for release purposes in the event of spring breakage, spring deformation, or loss of anchoring point 51, an appropriate warning indication is signalled by a distinctively marked dial 69 which is visible through a window in the mechanism cover (not illustrated). As appears in Figures 1 and 5A, dial 69 is rotatable with a shaft 70 mounted in frame plates 26 and 50 under influence of an attached lever arm 71. A free end of lever arm 71 is biased into engagement with the surface of spring 43 by biasing spring 712 and, when the spring is removed for any of the foregoing reasons, the arm 71 displaces warning dial 69 to signal a failure.

As thus far described, the release mechanism will function to rotate a cam 57 to a predetermined angular position about its shaft 48 upon expiration of a pre-set interval following release of locking gear 22 by the locking pin 19, the latter being actuated to an unlocking condition by both withdrawal of the arming wire 12 and by the sensing of altitudes below a predetermined level by aneroid 13. At the aforesaid predetermined angular position, actuating point 72 on cam 57 displaces a cam follower arm 73 by a predetermined angle about the axis of its pivot shaft 74, against restraint of a spring 75 (Figure 6). Cam follower arm 73 has an end 76 thereof disposed to bear against and, in turn, to rotate a lever 77 which is fastened to a rotatable cam shaft 78. A transversely-slotted portion 79 of cam shaft 78 is disposed to cooperate with an end 10b of the arming lever 10. By virtue of the transverse slotting along shaft portion 79, the shaft there in cross-section appears as a sector of a circle. As the shaft 78 is angularly oriented to a predetermined angular position, the arming lever end 10b may unlatch instantaneously from the cylindrical surface of the shaft to be deflected through the slot therein. In so moving, the arming lever 10 removes its end 10a from obstructing relationship to spring cap 7, and the main power spring 3 expands instantly to actuate the output cable 5 in the intended manner. A biasing spring 80 tends to return arming lever 10 to the armed position when a re-arming operation is performed. Release is accomplished positively and accurately, and without reflecting the sizable power spring forces back upon the timing or other control units. Important safety features are realized because of the fact that the power spring cannot be armed without accompanying setting of the timer. That is, the cam 57 must be displaced from the illustrated actuating orientation, by manipulation of the time-setting pointer, 68, before the arming lever 10 can be locked against the cooperating cam shaft 78. In turn, the aforesaid setting of the cam 57 cannot be accomplished without proper insertion of arming wire 12 into the mechanism. Accordingly, both the arming by arming wire 12, and the setting of time by manipulation of pointer 68, must be performed sequentially, to permit the power spring to be locked in the compressed state.

While a particular embodiment of this invention has been shown and described herein, it will occur to those skilled in the art that various changes, modifications and substitutions can be accomplished in practicing these teachings without departing in spirit or scope from the invention as set forth in the appended claims.

What we claim as new and desire to secure by Letters Patent of the United States is:

1. Power release apparatus comprising an output member mounted on a support for movement between an armed position and a released position, force-applying means urging said output member to said released position, a movable arming member adjustable to hold said output member in said armed position and actuatable to release said output member for movement to said released position, motive means for producing substantially constant output forces, means for locking said motive means to prevent release of said output forces and for unlocking said motive means to release said output forces, means movable from set positions to a predetermined position responsive to said released output forces to actuate said arming member to release said output member, crank shaft means coupled with said motive means for rotation responsive to said released constant output forces, a pair of like inertia members mounted for oscillatory movements, and connecting rod means coupling said inertia members with said crank shaft means for simultaneous oscillatory movements thereby in instantaneously opposite directions, whereby said inertia members regulate the rate of movement of said movable means to said predetermined actuating position.

2. Power release apparatus comprising a support, a spring, an output member movable on said support between an armed position in which said spring is stressed by said support and member and a released position to which said output member is urged by said stressed spring, an arming member mounted on said support for movement between a first position wherein said arming member interferes with movement of said output member to said released position and a second position wherein said arming member releases said output member for movement to said released position, motive means for producing constant-torque output forces, means for locking said motive means to prevent release of said output forces and for unlocking said motive means to release said output forces, means angularly movable from set angular orientations in relation to said support to a predetermined angular orientation responsive to said released output forces to actuate said arming member to said second position, crank shaft means coupled with said motive means for rotation thereby responsive to said released constant-torque forces, a pair of like inertia members mounted for oscillatory angular movements, and connecting rod means coupling said inertia members with said crank shaft means for simultaneous oscillatory angular movements thereby in instantaneously opposite angular directions, whereby said inertia members regulate the rate of rotation of said angularly movable means.

3. Power release apparatus comprising an output member mounted on a support for movement between an armed position and a released position, force-applying means urging said output member to said released position, a movable arming member adjustable to hold said output member in said armed position and adjustable to release said output member for movement to said released position, motive means for producing substantially constant output torques, means for locking said motive means to prevent release of said output torques and for unlocking said motive means to permit release of said output torques, means angularly movable by said motive means from set angular orientations to a predetermined angular orientation responsive to said released output torques to actuate said arming member to release said output member, crank shaft means coupled with said motive means for rotation thereby, a pair of like inertia members of equal mass pivoted on said support for angular movement about axes which extend in the same direction and lie in the same plane, and connecting rod means connecting each of said inertia members with said crank shaft means eccentrically about the axis of said crank shaft and eccentrically about the pivot axis of each of said inertia members, said connecting rod means being disposed to oscillate said inertia members about said axes simultaneously and in instantaneously opposite angular directions responsive to rotation of said crank shaft means, whereby environmental shock and acceleration forces experienced by said inertia members are transmitted to said crank shaft means in mutually cancelling relationship.

4. Power release apparatus as set forth in claim 3 wherein said pivot axes for said inertia members are parallel to one another and to the axis of rotation of said crank shaft means at equal distances from said axis of said crank shaft means, wherein said connecting rods are pivotally connected with said crank shaft means at equal radial distances from said crank shaft axis and at diametrically opposite positions, and wherein said connecting rods are pivotally connected with said inertia members at equal radial distances from said axes.

5. Power release apparatus comprising a support, an output member mounted on said support for movement between an armed position and a released position, force-applying means urging said output member to said released position, a movable arming member adjustable to hold said output member in said armed position and actuatable to release said output member for movement to said released position, an elongated spring member, a time-setting member on said support rotatable from one angular orientation to other angular orientations each of which is related to a desired different time delay, means coupling said spring with said time-setting member for winding by rotation of said time-setting member and for application of substantially constant torques to said time-setting member tending to return said time-setting member to said one angular orientation, means for locking and unlocking said time-setting member in angular orientation on said support, crank shaft means coupled with said time-setting member for rotation responsive to rotation of said time-setting member, a pair of like inertia members mounted for oscillatory movements, connecting rod means coupling said inertia members with said crank shaft means for simultaneous oscillatory movements by said crank shaft means in instantaneously opposite directions, and means actuated by said time-setting member for actuating said arming member to release said output member when said time-setting member assumes said one angular orientation.

6. Power release apparatus comprising a support, an output member mounted on said support for movement between an armed position and a released position, force-applying means urging said output member to said released position, a movable arming member adjustable to hold said output member in said armed position and actuatable to release said output member for movement to said released position, an elongated spring member pre-stressed to have a predetermined curvature throughout a length thereof, a time-setting member on said support rotatable from one angular orientation to other angular orientations each of which is related to a desired different time delay, said time-setting member having a winding surface thereon of curvature different from said predetermined curvature, a spring take-up member disposed on said support and dimensioned to have said spring member wind itself thereon, means fastening one end of said spring member with said time-setting member, means for rotating said time-setting member from said one to said other angular orientations to wind predetermined portions of said length of said spring about said winding surface, whereby said time-setting member exerts substantially constant torque about the axis of rotation thereof, means for locking and unlocking said time-setting member angularly about said axis, crank shaft means coupled with said time-setting member for rotation responsive to said torque exerted by said time-setting member, a pair of like inertia members mounted on said support for oscillatory movements, connecting rod means coupling said inertia members with said crank shaft means for simultaneous oscillatory movements by said crank shaft means in instantaneously opposite directions, and means actuated by said time-setting member for actuating said arming member to release said output member when said time-setting member assumes said one angular orientation.

7. Power release apparatus comprising a support an output member mounted on said support for movement between an armed position and a released position, force-applying means urging said output member to said released position, a movable arming member adjustable to hold said output member in said armed position and actuatable to release said output member for movement to said released position, an elongated spring member pre-stressed to have a predetermined curvature throughout a length thereof, a time-setting member on said support rotatable from one angular orientation to other angular orientations each of which is related to a desired different time delay, said time-setting member having a winding surface thereon of curvature different from said predetermined curvature, a spring take-up member disposed on said support and dimensioned to have said spring member wind itself thereon, means fastening one end of said spring member with said time-setting member, means for rotating said time-setting member from said one to said other angular orientations to wind predetermined portions of said length of said spring about said winding surface, whereby said time-setting member exerts substantially constant torque about the axis of rotation thereof as said spring member tends to wind itself upon said take-up member, means for locking and unlocking said time-setting member angularly about said axis, crank shaft means coupled with said time-setting member for rotation responsive to said torque exerted by said time-setting member, a pair of inertia members of equal mass pivoted on said support for angular movement about axes which extend in the same direction and lie in the same plane, connecting rod means connecting each of said inertia members with said crank shaft means eccentrically about the pivot axis of each of said inertia members, said connecting rod means being disposed to oscillate said inertia members about said axes simultaneously and in instantaneously opposite angular directions responsive to rotation of said crank shaft means, and means actuated by said time-setting member for actuating said arming member to release said output member when said time-setting member assumes said one angular orientation.

8. Power release apparatus as set forth in claim 7 wherein said spring member is flat, wherein said time-setting member includes a cylindrical drum portion having said winding surface thereon and further includes a manually-actuatable portion for angular adjustment thereof, and wherein said take-up member comprises a rotatable drum having a winding surface thereon of curvature substantially the same as said predetermined curvature.

9. Power release apparatus as set forth in claim 7 further comprising resilient means biasing said locking and unlocking means to unlock said time-setting member, arming means movable to and from a position wherein said arming means actuates said locking and unlocking means to lock said time-setting member, and pressure-responsive means actuating said locking and unlocking means to lock said time-setting means responsive to atmospheric pressures less than a predetermined value.

10. Power release apparatus comprising a support, a power spring, an output member mounted on said support for movement between an armed position in which said spring is stressed by said spring and member and a released position to which said output member is urged by said spring, an arming lever on said support movable between a first position wherein said lever interferes with movement of said output member to said released position and a second position wherein said lever releases said output member for movement to said released position, an elongated flat spring member pre-stressed to have a predetermined curvature throughout a length thereof, a first drum having a winding surface thereon of curvature substantially the same as said predetermined curvature, a second drum mounted for rotation on said support and having a winding surface thereon of curvature different from said predetermined curvature, said spring being wound about said first drum and having an end fastened for rotation with said second drum whereby predetermined portions of said spring length are wound about said surface of said second drum as said second drum is rotated in one angular direction, manually-actuated means for rotating said second drum in said one direction to predetermined angular orientations related to desired different time delays, cam means rotatable with said second drum, cam follower means movable on said support to actuate said arming lever to said second position responsive to movement of said cam means to a predetermined angular orientation, rotatable crank shaft means, a pair of like inertia members mounted on said support for oscillatory movements about axes extending in the same direction and lying in the same plane, connecting rods coupling said inertia members with said crank shaft means for simultaneous oscillatory movements by said crank shaft means in instantaneously opposite directions, gear means translating angular movements of said second drum into rotation of said crank shaft means, a locking pin movable on said support into and out of locking relationship with said gear means, means resiliently urging said locking pin out of said locking relationship, an arming member movable on said support to and from a position wherein said arming member holds said locking pin in said locking relationship, a catch pin angularly movable on said support about an axis to and from a holding relationship with said locking pin in which said locking pin is held in said locking relationship, and pressure-responsive means mounted on said support and angularly moving said catch pin to and from said holding relationship responsive to sensed pressures.

11. Power release apparatus as set forth in claim 10 wherein said pressure-responsive means includes at least one pair of sealed evacuated diaphragms at least one of which is fixed with said support, a lever angularly moving said catch pin responsive to linear movements of another of said diaphragms, and a balance weight coupled about said catch pin axis counterbalancing torques of said lever and catch pin thereabout, and further comprising a leak indicator member mounted on said support for movement from one position to a warning position responsive to expansion of said diaphragms beyond a predetermined amount, and a spring position indicator member disposed on said support for engagement with said spring member and movable to a warning position responsive to displacement of said spring member from wound relationships to said drums, and means resiliently urging said indicating member into said engagement with said spring member.

References Cited in the file of this patent

UNITED STATES PATENTS

| | | |
|---|---|---|
| 2,060,833 | Smith | Nov. 17, 1936 |
| 2,175,634 | McQuillen | Oct. 10, 1939 |
| 2,525,608 | Kuntz | Oct. 10, 1950 |
| 2,584,164 | Stallan | Feb. 5, 1952 |
| 2,676,655 | Hatfield | Apr. 27, 1954 |
| 2,835,344 | Allen | May 20, 1958 |